June 11, 1940. C. FUMAGALLI 2,204,101
CONTROLLER FOR BATTERY CHARGING APPARATUS
Filed May 4, 1938
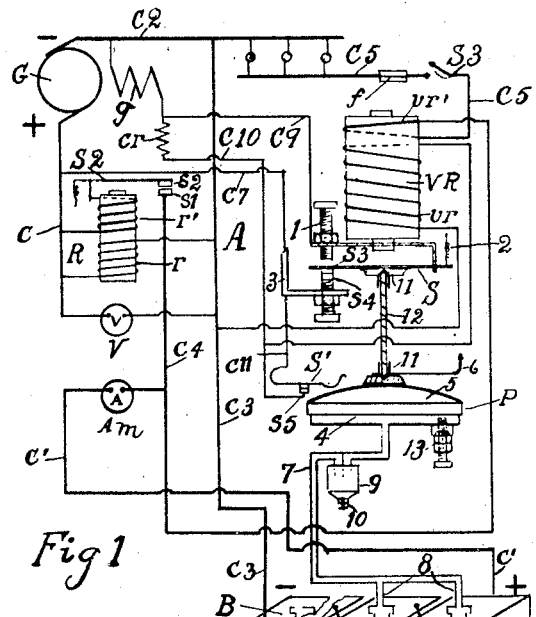
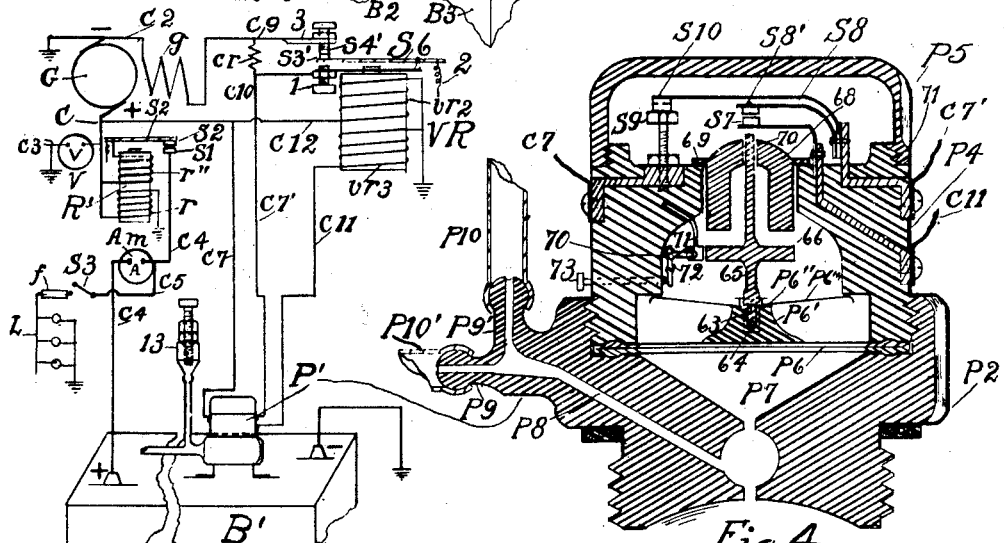
INVENTOR:
Charles Fumagalli,
BY C. C. Hines,
ATTORNEY.

Patented June 11, 1940

2,204,101

UNITED STATES PATENT OFFICE 2,204,101

CONTROLLER FOR BATTERY CHARGING APPARATUS

Charles Fumagalli, Guatemala City, Guatemala

Application May 4, 1938, Serial No. 206,060

17 Claims. (Cl. 171—314)

This invention relates to controllers for battery charging apparatus or current storage and supply systems using storage batteries, and particularly to means for automatically regulating the rate of charge of a battery or group of batteries from a generator, by reducing the charging rate of the generator or rendering the generator ineffective for a charging action, as may be required according to battery or system conditions in order to prevent injury to the battery, generator or other parts of the system.

One object of the invention is to provide means governed by the state of charge of the battery for automatically regulating the charging rate of the generator to meet service conditions.

Another object of the invention is to provide means for relieving the generator from a full delivery charge so as to prevent damage to said generator or any other parts of the circuit during the time when current of high amperage can not be handled by the battery, by reducing the amount of said amperage and voltage when the voltage increases beyond a certain safe point occasioned by broken or loose connections, dirt or grit in battery terminals or in any point of the charging circuit.

Still another object of the invention is to provide means governed by excess generation of gases in the battery, due to a too high rate of charge or other conditions, to govern the rate of charge so as to prevent damage to the battery or other parts of the system.

Still another object of the invention is to provide means operating under excessive charging and gas generating conditions of the battery for rendering the generator ineffective for a charging action until relief is afforded to prevent damage to the battery.

Still another object of the invention is to provide simple, reliable and efficient control means operating under abnormal conditions in the system liable to cause injury to the battery, generator or other parts of the system, such as to cause undue increase of resistance to the normal flow of current, to either control the supply of current to the battery in such manner as to prevent liability of damage to the same or the generator or other working parts, or to render the generator ineffective for a generating action.

In the accompanying drawing—

Fig. 1 is a diagrammatic view of a battery fed current supply system having an exemplificative type of battery charging and charge controlling means embodying my invention.

Fig. 2 is a detail view of a regulating gas relief vent employed in connection therewith.

Fig. 3 is a diagrammatic view of a modified system embodying my invention.

Fig. 4 is a sectional view on an enlarged scale through the pressure controlled switch device.

Referring now more particularly to Figs. 1 and 2 of the drawing, A designates an electric current storage power supply and controlling circuit containing a suitably driven generator G having an exciter winding $g$, a storage battery B comprising any desired number of cells, three such cells B', B2 and B3 being shown in the present instance, an electromagnetic cutout R of common type, a magnetic voltage regulator V—R having an exciter winding $v$—$r$ and a series winding $v$—$r'$, a resistance shunt circuit containing a control resistance $c$—$r$, and switch members S and S', respectively.

Conductors C, C' through cutout R and ammeter AM respectively connect with the positive poles of the generator and battery, and a return conductor C2 is connected to the negative pole of the generator and through a conductor C3 to the negative pole of the battery. Conductor C is connected to one end of each of the coils, $r$, $r'$ of the cutout relay R and to conductor C3 through voltmeter $v$, and the opposite end of the coil $r$ is connected to the conductor C3, while the opposite end of the coil $r'$ is connected to a spring opened armature switch S2 having a contact $s2$ for engagement with a contact $s'$ carried by a conductor C4. This conductor C4 is connected to the conductor C' through ammeter AM, and said conductor C4 leads from ammeter AM to one end of the series bucking coil $v$—$r'$, the opposite end of which coil $v$—$r'$ is connected to a conductor C5 having arranged therein a circuit make and break switch S3 and a protector fuse $f$. The conductors C2 and C5 may supply current to lamps as shown or to any suitable number and types of devices to be operated or driven.

The buckling coil $v$—$r'$ is a series coil made of one or more turns of heavy wire and fitted on top of voltage coil $v$—$r$ at a certain distance therefrom for a very light bucking action to slightly weaken the tension of electromagnet V—R when using but a little current, and increasing said bucking action proportionately to the increase of current flowing to lights or devices to be operated or driven.

The voltage regulator V—R is disposed at one side of the switch S and its magnet core carries an adjustable stop screw 1. This screw limits and regulates the degree of upward movement of switch S toward coil V—R and its action under different degrees of magnetic strength of the coil. The switch S is pivoted near one end thereof for upward and downward movements and is normally held in closed position by a spring 2, and its free end is adapted to engage the screw 1 and is provided with a contact for engagement with a contact screw s4 carried by a conducting bracket 3. This contact s4 is also adjustable to regulate the extent of downward movement of the switch S to closed position and its position when closed with relation to coil V—R. By this means the sensitiveness of operation, or time period of operation, of the switch S under the action of a pressure controlled device P may be varied, as well as its position determining the influence of the attractive force of magnet coil V—R thereon.

Contact point s4 of switch S is connected to the positive pole of the generator by bracket 3 and conductor C7 leading therefrom to conductor C. Contact point s3 is connected to the negative pole of the generator by conductor C9 through shunt field winding g to conductor C2. Contacts s3 and s4 of switch S are connected in parallel through conductors C9, C10 and C11, switch S' and resistance c—r, that are also arranged in series with shunt g. The switches S, S' cooperate with the resistance shunt circuit thus formed to regulate the charging rate or stop the action of the generator, as hereinafter described.

Arranged beneath the switch S or at the side thereof opposite the voltage regulator V—R is the pressure operated device P controlled by battery gases for operating said switch. This device comprises a pressure chamber 4 having a diaphragm or wall 5 movable upwardly under pressure therein and movable downwardly under action of a spring pressed member 6. Communicating with this chamber is a pipe or tube 7 having one or more inlet branches 8 adapted for detachable connection with the water supply inlets of one or more battery cells of the battery B, through which pipe gases generated in such battery cell or cells may pass to the chamber 4. The branch or branches 8 employed allow connection to be made with one or more cells of the group so that conditions may be met to secure the most reliable and effective results. In said pipe 7 is a trap 9 for catching moisture passing off with the gases and preventing flow of the same with the gases to the chamber 4, said trap having a drain plug 10 whereby the trapped moisture may be discharged therefrom whenever required. The switch member S and diaphragm 5 are provided with tubes or sockets 11 having conical seats receiving the conical ends of a motion transmitting rod 12 whereby upward movement may be transmitted from the diaphragm 5 to the switch S to open the latter. Whenever the battery becomes overloaded at a period approaching overcharge or from any cause generates gases, and damage to the battery is liable to ensue, these gases on discharge will pass into the chamber and elevate the wall or diaphragm to transmit motion to rod 12 to open the switch S without opening switch S'. Connected to the chamber 4 is a pressure relief or vent device 13 comprising a casing 14 internally threaded to receive a screw 15 having a vent groove 16 formed therein. This groove extends at an angle to the axis of the screw so as to open at one end through the inner end of the screw and at its outer end through the screw at one side thereof. This groove is of tapered or flaring form so that by adjustment of the screw the effective area of the groove at its outlet end may be varied to regulate the action of the vent to govern the pressure applied to the diaphragm, and the sensitivity and degree of movement of the diaphragm. Jamb and lock nuts 17 and 18 are provided to secure the vent screw in adjusted position. The pressure regulation and action of the diaphragm is such that switch S' will not be opened under ordinary upward movement of the diaphragm 5 sufficient to open switch S, but only when the diaphragm moves upwardly to a maximum degree, as during very rapid generation of the gases by the battery, switch S' serving as a safety switch during such conditions to entirely stop the operation of the generator.

The charging operation is as follows:

Fig. 1 shows the normal position of the parts of the system as when the generator is at rest. On the driving of the generator by mechanical action, current flows, energizing field winding g by flowing from the positive terminal c of the generator by wire c7, by bracket 3, through contacts S4 and S3 by wire c9 and switch S through field winding g, back to terminal of the generator negative c2. The generator field thus being energized, the generator builds up higher electrical tension and a charging circuit is established for current flow from the positive terminal of the generator by wire C, through relay R, as contacts S2 and S1 close under tension of current through relay windings, by wire C4 through ammeter AM and wire C' to the positive pole of battery B, the circuit being completed through wire C3 leading to generator negative conductor C2.

When the battery is at a low state of charge it will stand a reasonably high rate of amperage, so that all the current generated by generator G will pass through battery elements in a safe way up to a certain high state of charge without harm to the battery, but when current is still supplied at full charge or at a certain state of high charge of the battery the battery will be overloaded and will generate gas. The continued and prolonged generation of a high rate of charge driven through the battery or not properly proportioned according to the state of charge of the battery will first cause it to generate gas and then to overheat, resulting in buckling or other damage to the battery plates and current overloads in the circuit liable to damage the generator or other parts thereof. The rate of charge should then be reduced to prevent damage to battery elements. When gassing occurs the gases discharging through tube 7 into chamber 4 will produce pressure therein of a degree dependent on the amount of gases generated and relief afforded by vent 13, which is adjusted to secure the best working conditions. This pressure will cause expansion of chamber 4, the wall or diaphragm 5 of which will rise and open switch S to lift contact s3 out of engagement with contact screw s4. In this lifting action of switch S the pressure device will be assisted by the action of coil V—R, which will have sufficient attractive force for that purpose and to hold switch against vibrating or chattering as long as it is held open by rod 12. Switch S being open the resistance shunt circuit C7, C10, C11, S' will be brought into action to reduce the excitation of generator coil g and the charging rate of the generator to a safe degree and to effect charging of the battery at a rate to stop or materially reduce gas generation. Upon relief of pressure from the chamber 4 when the battery gassing action is stopped or reduced the diaphragm 5 will contract and switch S will be released and returned to closed position by spring 2, thus short circuiting the shunt resistance and restoring normal battery charging rate. Should, however, the gassing action be at a very great or rapid rate diaphragm 5 will be moved upward to a maximum degree, thus opening both switches S, S' and cutting off the flow of current to the exciter coil $g$ and stopping the charging action of generator G. The degree of expansion of chamber 4 under the action of the gases may be regulated as desired for opening actions of switches S and S' by regulation of the relief action of the vent device 13.

It will thus be understood that when contacts $s3$ and $s4$ are separated or opened to break the charging circuit at that point resistance $c-r$ will be cut in to govern the rate of charge of the generator, but when switch S' is also opened to break the circuit at contact point $s5$ this action will completely deenergize the field $g$, causing generator to absolutely stop generating.

The regulator switch S operates in three different ways according to the variation of voltage in the circuit. Firstly, when the voltage is low, holding coil V—R exerts a lifting force on switch S sufficient merely to assist rod 12 of the pressure operated device P in moving said switch to open position under lighter gas pressures in the chamber 4 and to lightly hold the switch against the stop screw 1 in opposition to the force of spring 2, but so lightly that the spring 2 may instantly close the switch on a slight recession of rod 12. Secondly, as the voltage increases the magnetic strength of the coil V—R will be increased proportionately to the increase of voltage to delay the closing action of switch S at low pressures in chamber 4 until the voltage has reached its highest intensity under normal conditions and until the battery is fully charged. Then the strength of the magnetic action of coil V—R on switch S will be sufficient to hold said switch open and the circuit at contacts $s3$, $s4$ broken, so that the generator will operate at a constant low charging rate until a voltage drop occurs or the bucking coil $v-r'$ comes into action to reduce the strength of the magnet V—R, allowing switch S to close upon recession of rod 12. Thirdly, the switch S operates to break the circuit when the voltage through any cause is raised to a dangerously high intensity, in which case coil V—R will be energized to a still higher magnetic strength sufficient to cause the positive attraction of switch S thereby, thus separating the contacts $s3$, $s4$ and breaking the circuit. This action of breaking the circuit contacts by the action of the coil V—R may be regulated by adjustment of contact screw $s4$ so as to break the circuit at any desired voltage. By this means it will be seen that through the action of the coils $v-r$ and $v-r'$ or voltage regulator V—R and that of the pressure control device P the operation of the switches S and S' will be controlled to either regulate the charging rate of the generator or to stop the generator as required according to the state of the battery and voltage or amperage conditions in the system. When the battery is low and a high charging rate is desirable, this is permitted and effected, except in the event that from any cause the generation is too rapid or voltage or amperage too high and sufficient to cause gassing of the battery, whereupon the generating rate will be reduced until gassing decreases and the normal generating rate is automatically restored. At all other times, whether the battery is fully or partially charged, the coil V—R and pressure operating device P, operating in conjunction with the switches S, S' and the resistance shunt circuit, will control the generating action so as to prevent damage to the battery, the generator or other parts of the system and to regulate the charging action to maintain the battery at a high rate of charge and to supply current to the lamps or other devices supplied in a safe, reliable and efficient manner. The system also effectually takes care of conditions arising where the current drain on the battery is high and the battery is initially at a low state of charge by regulation of the switch actions in the manner described to maintain a high generating rate while at the same time, for a greater or less period as required, giving protection to those parts of the system liable to be damaged by excessive voltage or amperage.

The system shown in Figs. 3 and 4 corresponds in many respects with that shown in Fig. 1 and similar parts are designated by similar characters. In this system the generator G shunt field winding $g$ is connected in the circuit in a somewhat different manner, starting from the positive pole of the generator by wire $c1$ through pressure operated switch S5 contacts $s9-s10$ by wire $c7'$ through voltage regulator switch S6, contacts $s3'-s4'$, wire $c9$ through shunt field coil $g$ and the negative pole of the generator by wire $c2$.

The shunt coil $g$ regulation resistance $c-r$ is connected in series to shunt $g$, said resistance $c-r$ being connected in parallel to voltage regulator V—R and switch S6 and connected in series with switch S8'. Said resistance $c-r$ is connected at one end to conductor C9 leading to contact S4' and to one end of the coil $g$, which latter is connected at its opposite end to the generator negative conductor C2, and said resistance $c-r$ is connected at its opposite end to conductors C10—C7' leading to switch contact S7 and to switch S8 which are normally connected by contacts S9—S10 to positive conductor C7.

The voltage regulator V—R is composed of two coils $v-r2$, $v-r3$ that are in parallel to generator G. Coil $v-r2$ is connected at one end by conductor C12 to the positive pole of the generator and at its opposite end to the negative pole of the generator or to a ground connection for flow of current from generator positive through the coil and to generator negative. Contacts S9 and S10 are connected in parallel with the generator but in series with resistance $c-r$ and shunt $g$ by wires C and C7 through S9 and S10, wire C7', resistance $c-r$ and shunt $g$ back to the negative pole of the generator. Contacts S7 and S8 are also connected in parallel to the generator and resistance but are in series with coil $v-r3$ from the positive pole of the generator by wires C and C7 through contacts S7 and S8 to ground of coil $v-r$ and back to the negative pole of the generator.

The charging circuit is as follows: Starting from the positive terminal of the generator G, through wire C, through cut out relay R' closing coil $r$ to ground and through holding coil $r''$, through switch S2, contacts $s2$, $s1$ by wire $c4$, through ammeter AM to battery B' positive, through said battery to ground and back to the negative terminal of the generator and to ground. Voltmeter V is connected in parallel to generator G, to wire C and through its ground to generator ground.

Lighting circuit is connected to wire $c4$ and through its ground to generator ground.

The pressure operated controlling device as shown in Fig. 4 comprises an enlarged battery filler plug P' which fits in the filler opening of a storage battery cell the same as any vent plug. It is built in three sections. A threaded base P2 is screwed in the filler hole of a battery cell and packed by a rubber gasket to prevent leakage and also is screwed to a casing P4 which encloses a resilient disk or diaphragm P6 that is clamped between the base P2 and casing P4. The base P2 has a gas inlet opening or chamber P7 that is in communication with gas chamber of the battery. Communicating with said chamber is a passage P8 that communicates with coupling nipples P9, P9'. On the end of coupling P9' fits a flexible hose or tube P10 leading to an adjustable vent device 13 of the same type as that shown in Fig. 2.

To coupling P9 is connected another hose P10' that puts chamber P7 in gas communication with one or more other battery cells by suitable fittings to vent plugs of said cells. The casing P4 is also chambered and its chamber is separated from base P2 by the diaphragm disk P6.

The gases generated in battery cell or cells flow to chamber P7 and by connection P10 to vent 13. As the vent is adjusted so as to allow vent of gases at a certain rate, when these gases are generated at a faster rate pressure of the gases will occur in chamber P7 which will force or expand disk in an upward direction.

Disk P6 has at its center a hard rubber socket P6' which is provided with a shoulder P6'' supporting a compression plate spring P6''', said spring P6''' bearing at its ends against a shoulder inside of casing P4 so as to be placed under compression to exert a certain pressure on top of disk P6 and to normally press the same downward.

Socket P6' is formed with a slot 63 opening through its top and through opposite sides thereof. A push rod 65 fits at its lower end in the socket and carries a magnetic armature 66. Said rod at its lower end has a transverse hole receiving a cotter pin 64 which engages and is movable in slot 64, allowing rod 65 to have an up and down lost motion to let disk P6 move independent of rod 65 to a certain extent.

On rod 65 above magnetic armature 66 and held by casing P4 there is fitted a horse shoe like permanent magnet 68 which fits loosely on rod 65 and has an upward motion in the casing in order to allow rod 65 to be raised to its maximum upward movement, but said magnet 68 has a shoulder 69 to engage the casing and limit its downward movement. Rod 65 extends above the armature and through guide hole 70 in top of magnet 68.

Casing P4 is threaded at 71 to receive a closure cap P5. Projecting from the top of the casing are the contacts s7, s8', s9, s10 enclosed in the chamber formed by cap P5, which contacts are fastened to binding posts in casing P4, to which binding posts are connected the wires C7' and C11 by means of binding screws. Contact S9 is in the form of an adjustable screw threaded into post C7. Adjustable screw S9 has a lock nut to hold it in adjustment.

Combined charging action and regulation by electrical and gas pressure operated means is as follows:

When driving generator by mechanical energy a small amount of current flows from the positive terminal of the generator G by wire C7 through gas operated switch contacts S9—S10 and switch S8 (Fig. 4) and by wire C7' through voltage regulator switch contacts S3'—S4', by wire C4, through shunt field coil g and to the negative terminal of the generator G by wire C2. This current flow energizes field coil g, causing generator to increase its electric tension and current, then flows from the positive terminal of the generator by wire C through closing coil r of cutout relay R', through ground back to the negative terminal of the generator G. The core of R' being magnetized by a small amount of current passed through coil r, switch S2 is closed and a higher amount of current passes from wire C through holding coil r''', contacts s2—s1 by wire C4 through ammeter AM to battery B' and through it to ground and to the negative terminal of the generator and to ground.

Generated electrical energy passing through battery elements will cause battery to be charged. As previously stated, a storage battery when in a low state of charge is able to receive through its elements a reasonably high charge of current or amperage up to a certain high point of charge, but when the battery is charged beyond such certain high point it begins to generate gases in proportion to the quantity of current and its state of charge. The voltage also increases in proportion to the state of charge.

If then a high amount of current is driven through battery it will then begin to generate gas and any prolonged period of high charge will overheat the battery, shortening its life, and to prevent this damage is one of the objects of my invention by the use of combined electrical and gas pressure regulations. In the electrical regulation when the battery is at a low state of charge and the voltage is low in the complete circuit, voltage coil v—r2 being permanently in connection with the generator is magnetized to a certain degree according to the voltage which determines a triple operation of said coil v—r2. In the first operation coil v—r2 acts as an aid to coil to attract the armature of switch S6. The second operation is combined with the first, through the increasing intensity of voltage as battery resistance increases in proportion to its higher state of charge. Coil v—r2 is then magnetized to a stronger extent and proportionate to the state of voltage and acts to keep switch S6 open and contacts s3'—s4' out of contact for longer periods until the voltage in the circuit increases to a certain point, so as to be strong enough to permanently hold switch S6 in a circuit breaking position. This action is regulated as to sensitivity and time period by adjustment of screw I with relation to magnetic core of regulator V—R to such a determined distance as to control the attractive force of the magnet according to a desirable voltage. The third operation provides a safety control for the entire circuit when dirt or grit collects in certain connections and prevents certain contacts engaging or when contacts stick or there are loose or broken connections in the charging circuit which may raise the voltage to a certain and dangerous state which is liable to damage or burn out any of the apparatus of the circuits. When a dangerous voltage condition exists regulation coil v—r2 enters into action as said coil magnetizes to a greater magnetic energy, so as to be strong enough to attract armature S6 to break its contact with screw S4' and cause it to make contact with screw I, thus inserting resistance c—r into circuit to the generation of current.

The coil v—r3 being in series with contact points S7 and S8' through conductor c'' when contacts S7 and S8' are engaged enters into action only when the gases generated by battery increase on a tendency of the battery elements to become overheated.

Battery gassing to a certain quantity commences to develop pressure in chamber P7.

These gases are normally discharged from battery to the atmosphere by means of adjustable vent 13. This vent 13 is adjusted to allow a certain rate of escape of gases within a certain period of time. When the amount of gases generated by battery reaches a higher amount than can escape through the vent 13, then the pressure of the gases in chamber P7 raises disk P6 moving rod 65 upwardly and compressing spring P6''', the upper end of said rod 65 pushing contact point S7 into engagement with contact S8'. At the same time the magnetic armature 66 will be raised into contact with magnet 68, which will hold rod 65 in raised position and contracts S7—S8' engaged. Because of the circuit being closed at said contacts, the coil $v$—$r3$ will be placed in connection with the generator and current flowing through coil $v$—$r3$ will magnetize the same sufficiently to cause coil $v$—$r3$ to contact with coil $v$—$r2$ to attract armature S6, breaking circuit at contacts $s3'$—$s4'$, and forcing current to travel through the resistance $c$—$r$, which being in series with the shunt winding $g$ will deenergize the same and cut the rate of charge of generator to a fixed low amount of amperage. The reduction of the charging action through battery, instantly cuts down the amount of gases generated to an amount less than that allowed to escape by adjustment of vent 13. This will lower the value of pressure in chamber P7, causing disk P6 to descend under force of spring P6''' through its lost motion connection with rod 65, magnet 68 still, however, attracting armature 66 and holding rod 65 elevated to keep contacts in circuit closing position until disk P6 has descended to the point of taking up the lost motion connection whereupon, on the combined downward movement of rod 65 and magnet 68, disk P6 will pull rod 65 away from said magnet, causing contacts S7—S8' to disengage and break the circuit, thus deenergizing coil $v$—$r3$ and causing contacts $s3'$—$s4'$ to close circuit fully energizing the shunt $g$ of generator.

The safety voltage control operation has been already explained. Whenever from an unduly high voltage state the voltage is properly reduced the switch S6 will close circuit instantaneously at the same time gas controlled switch S8 breaks the circuit.

The higher the state of charge of the battery, the greater the amount of gases generated and the slower the release action of compression chamber P7, causing the disk P6 to release in greater or less periods of time and inserting the resistance $c$—$r$ into the generator circuit for greater or less periods of time, and as the battery by being charged causes a gradual increase of voltage in the charging circuit the second operation of coil V—R2 begins to take place holding the switch S6 in the breaking position to which it has been moved by the joint action of coils $v$—$r2$ and $v$—$r3$ for longer periods according to the amount of voltage which by action of the resistance $c$—$r$ cuts down the charging rate of generator. The operation of holding switch S6 open by the attractive force of coil $v$—$r2$ when battery voltage reaches its highest point and until the circuit voltage is reduced has already been described and is rendered variable by the adjusting screws in order to obtain a perfect control action. The third operation of breaking the circuit by action of $v$—$r2$ may take place at any time no matter whether the battery is dead or fully charged as this operation is a safety one to protect the generator and circuit from damage. This operation is regulated by the adjusting screw that holds contact S4' to the height of voltage desired and that which is safe for operation of the circuit.

It is very desirable to render the generator ineffective in case of dirt at contacts S7'—S8', broken connections or breaking of coil $v$—$r3$ or freezing of regulator switch contacts S3'—S4', or of clogging by dirt of vent device 13 or other working parts, as the battery when gassing to any degree sufficient to be damaged as a result of any of these imperfections or irregularities which will cause the battery to overheat. In such event and as the generation of gases increases to a still higher degree then the disk P6 will be forced to its highest point of movement causing switch S8, contacts S9 and S10 to break circuit and as said switch is in series with shunt winding $g$, it will under such conditions entirely deenergize said shunt winding, rendering the generator inoperative until the disk P6 has been relieved of the pressure of gases.

An automatic locking device 70 may be provided to lock the rod 65 at its highest point of movement and in circuit breaking position until manually released. This device is adapted to be forced by spring 71 under armature 66 when the armature reaches its highest position to keep the rod elevated and it will remain in this position until manually released. To effect its release a trip lever 72 is provided which may be operated by a push rod 73 from the outside of the diaphragm casing or by other suitable means.

In the use of the invention on automobiles for the purpose of charging the battery thereof a resistance may be connected in parallel to safety switch S8, by connecting it between wire connections C7 and C7'. This resistance may be proportioned so as to let the generator produce a very small amount of electricity to supply the discharge occasioned by ignition, etc.

Also a safety escape valve of any efficient and well known make may be installed in the exhaust tubing as to release the pressure of gases when it gets to an unsafe degree of high pressure.

It will be evident from the foregoing that my invention gives complete control over the charging system under the varying conditions set forth to maintain the battery in a properly charged state while protecting it, the generator and other parts of the system to prevent derangements and secure long life thereof. It will of course be understood that changes in the details of construction and arrangement of parts may be made within the scope of the appended claims without departing from the spirit or sacrificing any of the advantages of the invention.

What I claim is:

1. The combination of an electric circuit, a storage battery in said circuit, an electric generator in the circuit, means including a switch device connected to said circuit for controlling the charging rate of the generator, means including a switch device connected to said circuit for rendering the generator inactive or substantially so for charging the battery, and a pressure controlled device in connection with the battery and cooperating with the switches under the pressure of gases generated by the battery for controlling the action of said switches at predetermined pressures.

2. In an electrical supply system comprising an electrical circuit, a battery therein, and a generator having a field coil connected to one of its terminals, said generator being operative to supply current to said circuit and to charge said battery, a conductor adapted to be electrically connected in circuit with and disconnected from circuit with the field coil to energize and deenergize the same, a conductor containing a resistance and adapted to be electrically connected in circuit with and disconnected from circuit with the field coil to reduce the charging rate of the generator or render the generator ineffective, a first switch for normally connecting the first-named conductor with the field coil and movable to disconnect the same therefrom and to connect the other conductor with the field coil, a second switch for making and breaking the circuit through the second-named conductor, and a pressure controlled device connected to the battery so as to be operated by gas pressure therefrom and to operate said first and second switches in the order named at relatively low and high pressures.

3. In an electrical supply system comprising an electrical circuit, a battery therein, and a generator having a field coil connected to one of its terminals, said generator being operative to supply current to said circuit and to charge said battery, a conductor adapted to be electrically connected in circuit with and disconnected from circuit with the field coil to energize and deenergize the same, a conductor containing a resistance and adapted to be electrically connected in circuit with and disconnected from circuit with the field coil to reduce the charging rate of the generator or render the generator ineffective for a charging action, a first switch for normally connecting the first-named conductor with the field coil and movable to disconnect the same therefrom and to connect the other conductor in circuit with the field coil, a second switch for making and breaking the circuit through the second-named conductor, a voltage coil coacting with the first switch and constructed to develop under normal voltages in the circuit a magnetic strength insufficient to move said switch and to develop at different higher abnormal voltages magnetic strengths of orders sufficient to retain the switch in its second-named position when moved to such position or to move the switch by attractive force to such position, and a pressure controlled device connected to the battery so as to be operated by gas pressure therefrom and to operate said first and second switches in the order named at relatively low and high pressures.

4. In an electrical current supply and battery charging system, an electric circuit including a generator and a battery charged by the generator, control means in said circuit governing the generator to reduce its generating rate or to render it ineffective for a generating action, said control means including primary and secondary control elements arranged to be engaged and operated in their order named to respectively govern said control means for such respective actions, and a pressure controlled means connected to the battery and movable means under pressure of gases therefrom to engage and render said primary control element active at one pressure and to engage and render said secondary control element active at a different pressure.

5. In an electrical current supply and battery charging system, an electric circuit including a generator and a battery charged by the generator, control means in said circuit governing the generator to reduce its generating rate or to render it ineffective for a generating action, said control means including primary and secondary control elements arranged to be operated in their order named to respectively govern said control means for such respective actions, electromagnetic means in the circuit operative under an abnormally high voltage to actuate one of said elements, and a pressure controlled means connected to the battery and including means movable under pressure of gases therefrom to engage and render said primary control element active at one pressure and to engage and render said secondary control element active at a different pressure.

6. The combination of a main electric circuit, a storage battery in said main circuit, an electric generator in the main circuit having a field winding, a shunt circuit connected across the terminals of the generator and including said field winding and a resistance in circuit therewith for reducing the charging rate of the generator, means including a first switch device in the shunt circuit and connected to the main circuit and controlling said shunt circuit to bring the resistance into action, means including a second switch device connected in the shunt circuit and to the main circuit for rendering the generator inactive or substantially so for charging the battery, and a pressure controlled device in connection with the battery and cooperating with the switches under the pressure of gases generated by the battery for operating the first switch at one pressure and operating the second switch at a different pressure.

7. The combination of an electric circuit, a storage battery in said circuit, an electric generator in the circuit, means including a first pressure operated switch device for controlling the charging rate of the generator, means including a voltage actuated cut out device and a second pressure operated switch device for rendering the generator inactive or substantially so for charging the battery, and a pressure controlled device connected with the battery and operable at one pressure to actuate said first switch and operable at a different pressure to actuate said second switch.

8. The combination of a main electric circuit, a storage battery in said main circuit, an electric generator in the main circuit, and having a field coil, a shunt circuit connected across the terminals of the generator and including a resistance in circuit with the field coil for reducing the charging rate of the generator, a first switch device controlling said shunt circuit to bring the resistance into action, means including a second switch device for rendering the generator inactive or substantially so for charging the battery, means governed by voltage conditions in the circuit for actuating the first switch, and a pressure controlled device connected with the battery and operable at one pressure to actuate the first switch and operable at a different pressure to actuate the second switch.

9. The combination of an electric circuit, a storage battery in said circuit, a generator for supplying current to the circuit and charging the battery, a pressure operated device connected with the battery so as to be operated by the pressure of gases generated by the battery, and controlling elements connected in said circuit and adapted to be respectively operated at different pressures by said pressure operated device for reducing the generating rate of the generator and for rendering the generator ineffective for charging the battery.

10. The combination of an electric circuit, a storage battery in said circuit, a generator for supplying current to the circuit and charging the battery, a movable pressure operated device connected with the battery so as to have different ranges of movement under pressures of gases generated by the battery, a pair of control devices operated by said pressure operated device under different ranges of movement thereof at different relatively low and high gas pressures to respectively reduce the charging rate of the generator and to render the generator ineffective for a charging action, and an electrically controlled device operable independently of the pressure controlled device and governed by circuit conditions for controlling the first-named control device to regulate the generating action.

11. The combination of an electric circuit, a storage battery in said circuit, a generator for supplying current to the circuit and charging the battery, a pressure operated device operated by the pressure of gases generated by the battery, control means including a primary control device operable by said pressure operated device at one pressure to reduce the charging rate of the generator and a secondary control device operable by said pressure operated device at a different pressure to render the generator ineffective for a charging action, and a device controlled by high voltage conditions in the circuit to also operate the primary control device.

12. The combination of a main electric circuit, a storage battery in said circuit, a generator in said circuit for supplying current to the circuit and charging the battery, a shunt circuit connected across the terminals of the generator and including a resistance in circuit with the field winding of the generator, said resistance adapted to be cut into and out of the shunt circuit to reduce the charging rate of the generator or to allow a full charging action thereof, a pressure operated device connected to the battery and operated by pressure of gases generated by the battery, a switch governing the shunt circuit and adapted to be operated by the pressure operated device at a predetermined pressure for cutting said resistance into the shunt circuit, and a second switch controlling the shunt circuit and adapted to be operated by the pressure operated device at a higher pressure for disconnecting said shunt circuit from the main circuit.

13. The combination of an electric circuit, an electric generator in said circuit, a storage battery in said circuit adapted to be charged by the generator, controlling means adapted to be set into action to reduce the output of the generator or to cut the generator into and out of the circuit, said controlling means including a first switch for rendering the generator active or inactive and a second switch for cutting the generator into or out of the circuit, an electromagnetic voltage regulating coil in the circuit arranged to influence movement of the first switch to throw the output controlling means into and out of action, said coil having an exciter winding for developing a magnetic force proportional to circuit voltages and a winding for bucking said exciter winding proportional to current flow in the circuit, means for adjustably controlling and regulating the action of said first switch with relation to said coil, and a gas pressure operated device in communication with the battery and operative to actuate the first switch at one pressure and to actuate the second switch at a different pressure.

14. The combination of an electric circuit, a storage battery in said circuit, an electric generator in the circuit having a field winding, a resistance adapted to be cut into circuit with the field winding for reducing the charging rate of the generator, a first switch for cutting said resistance into and out of circuit with the field winding, a second switch for initiating a resistance cut in operation of the first switch, a stopping switch for rendering the generator ineffective for a charging action, an electromagnetic voltage regulating coil in the circuit aranged to influence movement of the first switch in resistance cut in direction, said coil having a winding for developing a magnetic force proportional to circuit voltages and acting to move said first switch to resistance cut in position at a certain voltage and a winding adapted to be energized on the closing of the second switch for coaction when energized with the first-named winding for operating the first switch for a resistance cut in action, means for adjustably controlling and regulating the action of said first switch with relation to said coil, and a pressure controlled device operating under pressure of gases from the battery and operable to actuate said second switch at one pressure and to actuate said stopping switch at a different pressure.

15. The combination of an electric circuit, an electric generator in the circuit having a field coil connected to one of its terminals, a battery in the circuit adapted to be charged by the generator, a conductor adapted to be connected in circuit with and disconnected from circuit with the generator field coil for energizing and de-energizing the same, a conductor adapted to be connected in circuit with and disconnected from circuit with the field coil and containing a resistance for reducing the charging rate of the generator, a first switch normally connecting the first-named conductor in circuit with the field coil and movable to disconnect the same from circuit with the field coil and connect the second-named conductor in circuit with the field coil, a second switch for permitting or preventing flow of current through the second-named conductor and normally arranged to permit flow of current therethrough, electrical means controlled by circuit conditions for moving the first switch from its first-named to its second-named position, and pressure operated means connected to the battery and governed by gas generation by the battery for actuating said first switch at one pressure to move it from its first-named to its second-named position and for actuating said second switch at a different pressure to prevent flow of current through the second-named conductor.

16. The combination of an electric circuit, a generator in said circuit, a battery in the circuit adapted to be charged by the generator, controlling means in the circuit including primary and secondary control elements, one actuable to control said control means for reducing the charging rate of the generator and the other actuable to control said control means for rendering the generator ineffective for a generating action, and means connected to the battery and movable to different degrees by pressure of gases generated by the battery for first engaging and actuating said primary control element at one pressure and then engaging and actuating the secondary control element at a higher pressure.

17. The combination of an electric circuit, an electric generator in the circuit having a field coil, a battery in the circuit adapted to be charged by the generator, a conductor adapted to be electrically connected in circuit with or disconnected from circuit with the generator field coil to energize or deenergize the same, a conductor containing a resistance adapted to be electrically connected in circuit with or disconnected from circuit with the generator field coil for reducing the charging rate of the generator, a first switch normally connecting the first-named conductor in circuit with the field coil and movable to disconnect the same from circuit with the field coil and connect the second-named conductor in circuit with the field coil, a second switch for permitting or preventing flow of current through the second-named conductor and normally arranged to permit flow of current therethrough, and pressure operated means connected to the battery and governed by gas generation by the battery for actuating said first switch at one pressure to move it from its first-named to its second-named position and for actuating said second switch at a different pressure to prevent flow of current through the second-named conductor.

CHARLES FUMAGALLI.